Figure 1:
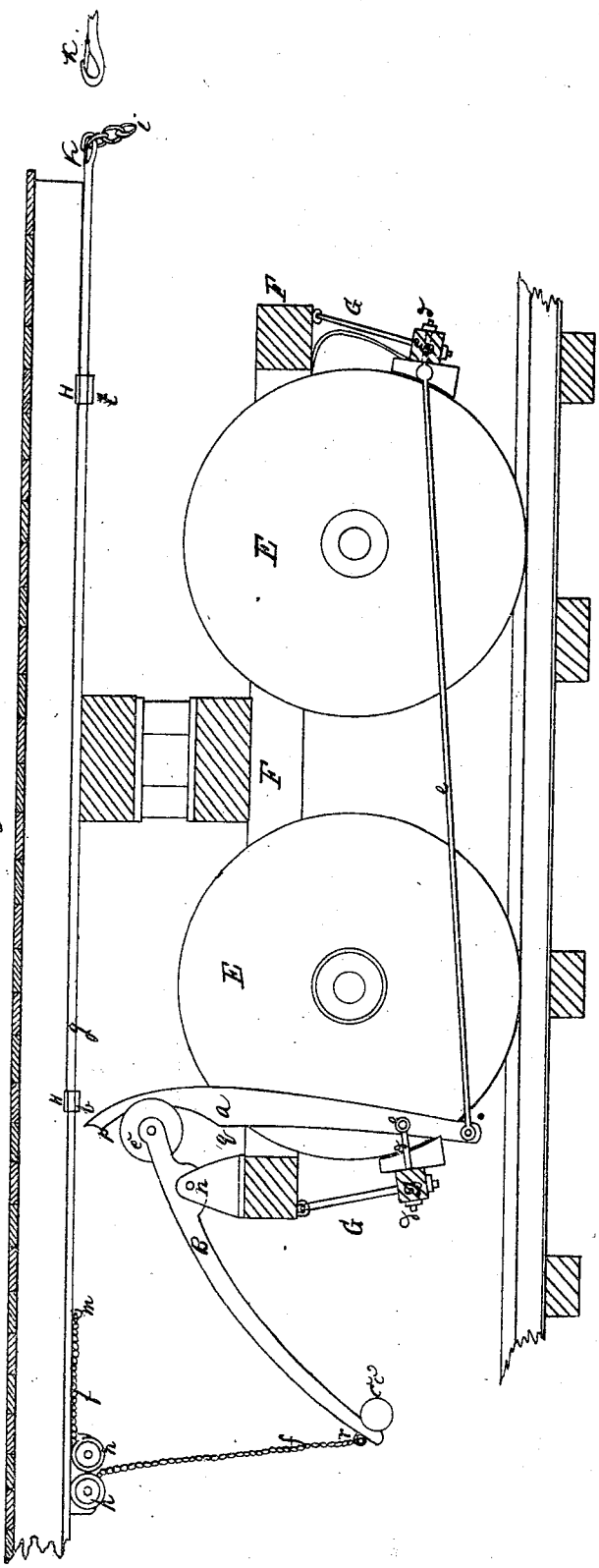

F. Dengler.
Car-Brake.
Nº 72984. Patented Jan. 7, 1868

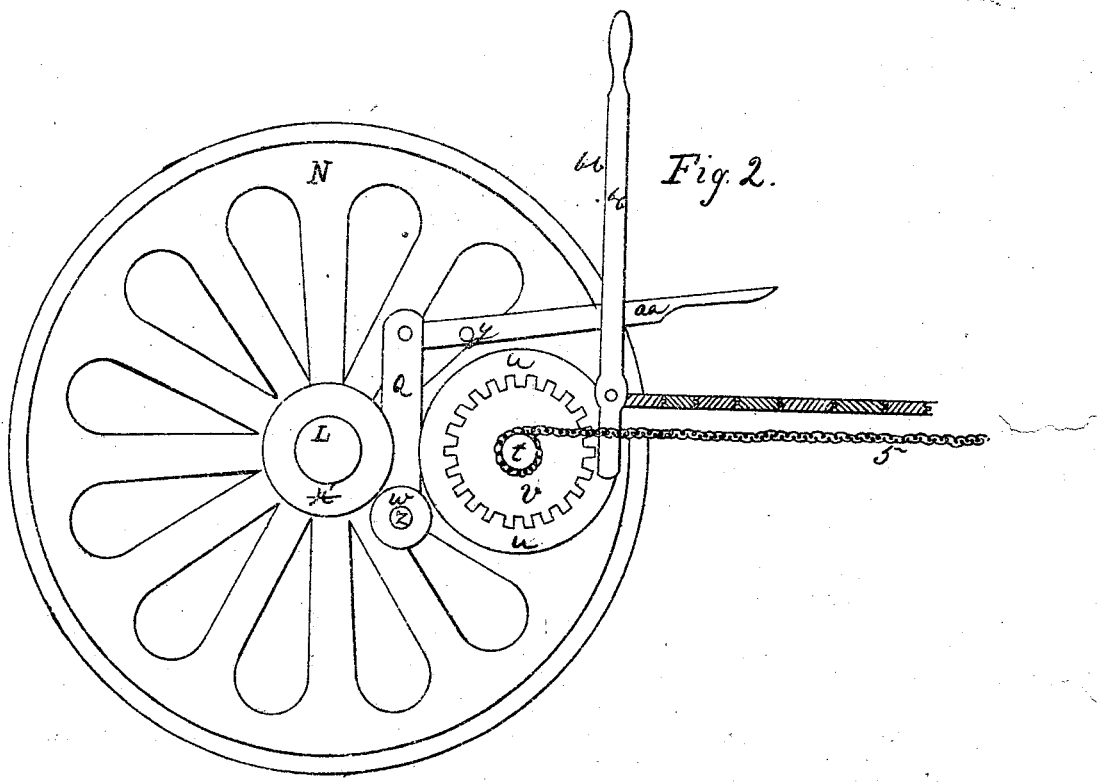

UNITED STATES PATENT OFFICE.

FREDRICK DENGLER, OF NORTH VERNON, INDIANA.

IMPROVED CAR-BRAKE.

Specification forming part of Letters Patent No. 72,984, dated January 7, 1868.

*To all whom it may concern:*

Be it known that I, FREDRICK DENGLER, of North Vernon, Jennings county, State of Indiana, have invented certain new and useful Improvements in Railroad-Car Brakes; and I do hereby declare the following description and accompanying drawings are sufficient to enable any person skilled in the art to which it most nearly appertains to make and use my said improvements without further invention or experiment.

The nature of my invention consists in the peculiar construction and arrangement of devices described in the following specification and represented in the drawings.

Figure 1 is a sectional elevation of a truck with my improved brakes attached. Fig. 2 shows a mode of applying the brakes by means of motion derived from a pulley on the car-axle.

In the accompanying drawings, D is the platform of a car, and F the truck-frame mounted on the wheels E E, which roll on the track E'. $d\ d$ are the brakes hung to the frame F by the rods G G. The brakes $d\ d$ are connected by the rods $e$ and $d'$ to the lever A, which is made in the form shown in the drawing, and extends up above the frame F, and is curved from $p$ to $q$, where the roller C acts on it. The roller C is hung in the end of the lever B, which is made in the form shown in the drawing, and vibrates on a pin in the stand $n$, fastened to the frame F, and is marked to apply the brakes by the chain $f$, fastened to the lever at $r$, and passes up between the rollers $h\ h$ and is fastened to the traverse-rod $g$, which slides in brackets H H, fastened to the under side of the platform D. C C is a weight fastened to the under side of the lever B to pull down the lever and release the brakes. A spring may be applied to the lever instead of the weight, if preferred. The rod $g$ may be traversed by some of the well-known devices in common use for that purpose to draw up the lever B, and push down the roller C, and vibrate the lever A, and draw the brakes against the wheels to stop the truck when required; or, if preferred, the chain F may be applied to an upright shaft with a hand-wheel upon it to apply the brakes.

In Fig. 2 I have represented devices for applying the brakes by means of the power derived from the axle of the locomotive, tender, or one of the cars. In this drawing, N is the wheel, L its axle, and H' a pulley fastened to the axle. $t$ is a shaft fitted to turn in proper bearings a little distance from the axle L. To this shaft $t$ the pulley $u$, gear $v$, and chain S are fastened. The lever $a\ a$ vibrates on a pivot, $y$, fastened in the frame, and works the link Q, which has a pivot in it for the friction-pulley $w$ to turn on.

This apparatus is so arranged that by depressing the lever $a\ a$ the link Q will draw the pulley $w$ against the pulleys H' and $u$ and set the latter in motion to turn the shaft and wind up the chain S, which is connected to the rod $g$, and apply the brakes to the wheels and stop the cars.

When the chain is wound up and the brakes applied, the lever $b\ b$ may be moved to lock the gear $v$ and shaft $t$ to hold the brakes on as long as may be required to stop the train. If the tender or first car is provided with the apparatus shown in Fig. 2, the brakes may be applied to all the cars in the train by it if the rods $g$ are all connected together and to the chain S.

Having described my improvements, I claim—

1. The lever B and roller C, acting on the curved lever A, all combined and operating substantially as described.

2. I claim the wheel H', fixed upon the axle, the wheel $u$, and cogged-wheel $v$ and pawl, and the intermediate roller $w$, all constructed and operating in combination with each other, as described.

FREDRICK DENGLER.

Witnesses:
 JOSEPH PRETZNER,
 JOS. M. STRICKER.